United States Patent
Pandey et al.

(10) Patent No.: US 11,663,422 B2
(45) Date of Patent: May 30, 2023

(54) SYSTEMS AND METHODS FOR PROVIDING MULTILINGUAL SUPPORT IN AN AUTOMATED ONLINE CHAT SYSTEM

(71) Applicant: PayPal, Inc., San Jose, CA (US)

(72) Inventors: Amit Pandey, Fremont, CA (US); Ajay Aswal, Santa Clara, CA (US); Deepak Raman, Santa Clara, CA (US); Harish Nalagandla, San Jose, CA (US); Jian Wan, San Jose, CA (US); Vinaykanth Manthena, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 369 days.

(21) Appl. No.: 16/898,038

(22) Filed: Jun. 10, 2020

(65) Prior Publication Data

US 2021/0390268 A1    Dec. 16, 2021

(51) Int. Cl.
*G06F 40/58*   (2020.01)
*H04L 51/02*   (2022.01)
*G06N 5/022*   (2023.01)
*G06N 5/025*   (2023.01)
*G06F 16/332*  (2019.01)

(52) U.S. Cl.
CPC .......... *G06F 40/58* (2020.01); *G06F 16/3329* (2019.01); *G06N 5/022* (2013.01); *G06N 5/025* (2013.01); *H04L 51/02* (2013.01)

(58) Field of Classification Search
CPC .......... G06F 40/58; G06F 40/44; G06F 40/45; G06F 40/47
See application file for complete search history.

(56) References Cited

U.S. PATENT DOCUMENTS

| | | | | |
|---|---|---|---|---|
| 7,457,397 | B1* | 11/2008 | Saylor | H04M 15/56 704/270.1 |
| 9,164,987 | B2* | 10/2015 | Chen | G06F 40/58 |
| 9,720,910 | B2* | 8/2017 | Byron | G06F 40/58 |
| 10,740,399 | B1* | 8/2020 | Eksombatchai | G06F 16/958 |
| 11,042,707 | B2* | 6/2021 | Garrote | G06F 40/30 |
| 11,188,580 | B2* | 11/2021 | Osmon | G06F 16/3329 |
| 2007/0027905 | A1* | 2/2007 | Warren | G06F 16/2452 |
| 2007/0255552 | A1* | 11/2007 | Thiesson | G06F 16/9537 704/8 |

(Continued)

*Primary Examiner* — Lamont M Spooner
(74) *Attorney, Agent, or Firm* — Haynes and Boone, LLP

(57) ABSTRACT

Methods and systems are presented for providing automated online chat assistance in multiple languages. A query in a first language is received via a chat robot from a user device. The query is machine-translated into a second language and transmitted to an artificial intelligence system that includes a dialog tree configured in the second language. The artificial intelligence system determines a response in the second language to the query by locating a node corresponding to an intent based on the query in the dialog tree. The node includes a node ID and response text in the second language. The artificial intelligence system transmits the second-language response including the node ID to the chat robot. The second-language response is intercepted, and first-language response text corresponding to the second-language response text is determined based on the node ID. The second-language response text is then provided to the user device by the chat robot.

20 Claims, 8 Drawing Sheets

(56) References Cited

U.S. PATENT DOCUMENTS

| | | | | |
|---|---|---|---|---|
| 2008/0020361 | A1* | 1/2008 | Kron | G09B 23/28 |
| | | | | 434/262 |
| 2014/0242955 | A1* | 8/2014 | Kang | G06F 40/58 |
| | | | | 455/414.1 |
| 2015/0142704 | A1* | 5/2015 | London | G06N 20/00 |
| | | | | 706/11 |
| 2016/0328387 | A1* | 11/2016 | Boutcher | G06F 40/237 |
| 2017/0177712 | A1* | 6/2017 | Kopru | G06F 16/3337 |
| 2017/0293611 | A1* | 10/2017 | Tu | G06F 16/48 |
| 2019/0172444 | A1* | 6/2019 | Hiroe | G06F 40/268 |
| 2019/0188324 | A1* | 6/2019 | Zhao | G06F 16/90332 |
| 2019/0236205 | A1* | 8/2019 | Jia | G06F 16/3329 |
| 2019/0273767 | A1* | 9/2019 | Nelson | H04M 7/0027 |
| 2019/0370370 | A1* | 12/2019 | Wittern | G06F 16/24556 |
| 2020/0034375 | A1* | 1/2020 | Tung | G06F 40/295 |
| 2020/0134032 | A1* | 4/2020 | Lin | G06F 16/2456 |
| 2020/0285636 | A1* | 9/2020 | Liu | G06F 40/263 |
| 2021/0064609 | A1* | 3/2021 | Riscutia | G06F 16/258 |
| 2021/0357378 | A1* | 11/2021 | Urdiales | G06F 16/2454 |

\* cited by examiner

SYSTEMS AND METHODS FOR PROVIDING MULTILINGUAL SUPPORT IN AN AUTOMATED ONLINE CHAT SYSTEM

BACKGROUND

The present specification generally relates to facilitating an automated online chat system, and more specifically, to providing support in multiple languages in an automated online chat system according to various embodiments of the disclosure.

RELATED ART

Service providers that provide services (e.g., purchases of goods, payment transactions, etc.) to customers often enable their customers to initiate direct communication with the service providers via one or more media or communication channels. For example, a customer may contact the service provider directly via phone or e-mail. However, these traditional communication channels suffer from multiple disadvantages. E-mail communication prevents the customers from receiving real-time feedback from the service provider. Calling the service provider via phone may require a long waiting time. Furthermore, certain information, such as transaction identifiers, may be difficult to communicate verbally over the phone, and thus, may be error-prone. As such, it has become increasingly popular for service providers to enable customers to communicate directly with them via an online chat session.

Through an online chat client, such as a mobile chat program, a chat client embedded within a service provider's website, or a voice-controlled client accessible through a voice assistant, a customer may conduct a conversation with the service provider, where the service provider provides automated responses to the customer's inquiries using a chat robot (or chatbot) in connection with an artificial intelligence (AI) system. Through a dialogue (e.g., exchanges of chat messages, also referred to as utterances herein), the service provider may quickly identify an issue that the customer would like to address (e.g., an intent), collect sufficient information from the customer, and address the issue raised by the customer. The chat robot may determine an intent of the customer based on one or more utterances provided by the customer via an online chat session, and may assist in resolving an issue of the customer by having an automated dialogue with the customer.

Intents and possible responses to each intent may be configured using a dialog tree stored within the AI system. The dialog tree may be created by a human operator, who configures the various possible intents and responses in a human language using an interface provided by the AI system. However, users may wish to interact with the chat robot in their preferred language, which may not be the same language that the dialog tree was designed to support. Providing support for multiple language within a chat robot may involve creating and maintaining multiple dialog trees, one for each language. Multiple independent instances of the chat robot may be run, one for each language, and testing efforts may be duplicated across all the instances. Dialog trees can quickly grow in complexity, and maintaining and expanding the dialog tree over time may be expensive, particularly when changes to a dialog tree in one language are to be propagated to dialog trees in other languages. Over time, human error or neglect may also lead the dialog trees to become inconsistent with each other. Furthermore, when components of a chat robot instance in one language are upgraded or changed, the upgrades or changes may need to be applied to other chat robot instances, increasing maintenance costs. Thus, there is a need for developing a chat robot that supports multiple human languages without incurring the complexity and expense of maintaining multiple dialog trees or chat robot instances.

Figure 1:
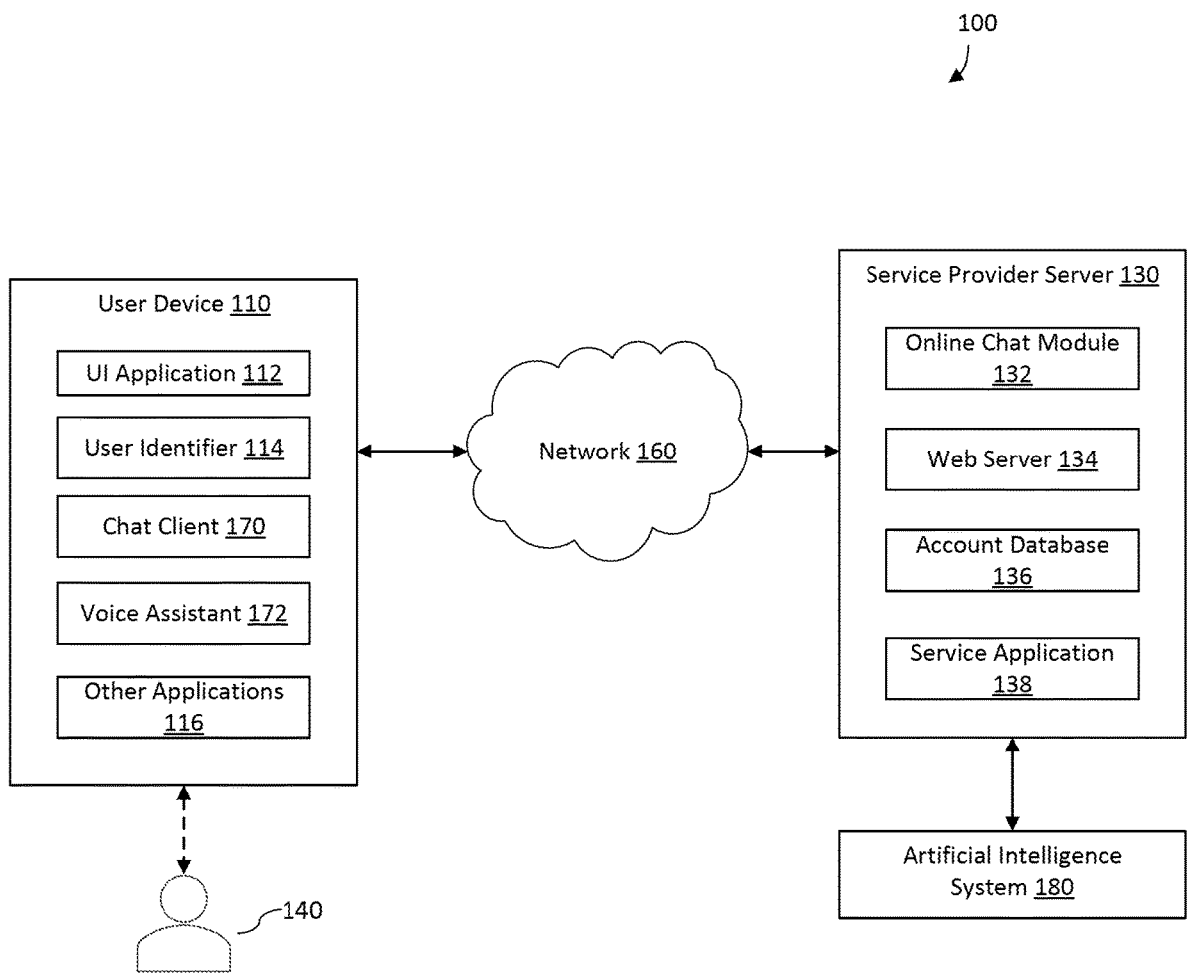
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for supporting multiple languages and/or locales (combinations of languages and regions or countries) in an automated online chat system. As discussed above, a service provider may utilize an online chat system that may include a chat robot (also referred to as a chatbot) to provide automated assistance to a customer in an online chat session. For example, upon receiving a request to establish an online chat session from a user device of a customer, the online chat system may establish the online chat session between the user device and the chat robot. The online chat session may be implemented as a stateless web service, while still appearing as a chat session the user (e.g., with messages organized in a conversation). For example, the online chat system may not maintain an active chat session with a user, but may maintain contextual information about a conversation and include sufficient information with each chat message to associate each chat message with a conversation. The user device may initiate the session explicitly (e.g., by opening a chat window on the service provider's website) or implicitly (e.g., by sending a text message from a mobile phone or asking a question through a voice assistant on a smart speaker). The chat robot system may include or communicate with an artificial intelligence (AI) system to automatically provide a dialogue with the customer via the online chat session. The online chat system may then use the chat robot to assist the customer via the online chat session. For example, the online chat system may respond to the customer's messages or questions about how to perform an action on the service provider's website, or provide the customer with information about a transaction the customer executed. In responding to a customer's questions, the online chat system may ask the customer follow-up questions. For example, if the customer requests information about a transaction, the online chat system may ask the customer for specific details to identify the transaction. The online chat system may be configured in a language (referred to as the primary language herein) or locale (a combination of a language and a region or country, referred to as the primary locale herein), which may be different than the language or locale in which the customer can or wishes to communicate with the online chat system. For example, language may be combined with a country or region to form a locale, which may be used to provide responses to user queries in different dialects of a language (e.g., American English as distinct from Canadian English), and/or to customize responses based on differing product offerings in different countries or regions. For example, the online chat system may be configured in American English (the primary language in this example, corresponding to the English-United States locale), and the customer may wish to communicate with the online chat system in Mexican Spanish (corresponding to the Spanish-Mexico locale). As discussed above, providing support in multiple languages or locales by running multiple instances of the online chat system, one for each language or locale customers of the service provider may use, may be expensive both in terms of human effort and hardware and software costs. For example, creating an instance of the online chat system for each language or locale may involve a human operator (or multiple human operators) creating a dialog tree for each language or locale. Nodes in the dialog tree may correspond to intents and may include a response to be transmitted to a user when the AI system determines an intent from the user's utterance. Each intent node may have child nodes corresponding to different entities, where the entities are determined from the user's utterance and help narrow down the information requested as part of the intent. Changes to a dialog tree in one language or locale may need to be propagated to other dialog trees, and updates and upgrades to the underlying software may need to be performed separately for each instance. Furthermore, running multiple instances of the online chat system may require greater hardware resources than running a single instance. Accordingly, embodiments of the present disclosure allow a service provider to run a single instance of a chat robot—with a single dialog tree—that supports dialog in multiple languages or locales.

In some embodiments, the online chat system may include a dialog tree configured in a primary language or locale, which may be the language or locale used by the largest number of customers of the service provider or the language of the country where the service provider is based. The dialog tree may be part of an AI system (e.g., an AI system for chat robots that supports natural language processing). Throughout the disclosure, American English or en_US (representing the English-United States locale) may be used as an example of the primary language or locale, but any language or locale may serve as the primary language or locale. The online chat system may receive a query from a user device via the chat robot during an online chat session in a first language or locale (e.g., the user's preferred language or locale), which may be different than a second language or locale (i.e., the primary language or locale) in which the dialog tree is configured. For example, a user may send a query (also referred to as a message or utterance) through a user device in Spanish to the online chat system. The query may be sent by the user as text, for example, through a chat client in a web browser or a short message service (SMS) message on a mobile device, or as speech, for example through a virtual assistant on a smart speaker with voice recognition capabilities, which may be transcribed to text. In some embodiments, the online chat session may be associated with a language, geographic region, or locale (i.e., a combination of geographic region and language). The online chat system may receive the locale information in a header (e.g., as a parameter in an HTTP header) transmitted to the system when the user initiates the chat session or sends a message. For example, the user may have an account with the service provider, and the account may be associated with a locale (e.g., based on the physical address provided by the user). Alternately, if the user initiates the online chat session through the service provider's website, the geographic region or locale may match that of the localized version of the website accessed by the user. The online chat system may use the associated language, geographic region, and/or locale to determine the language in which the user's query was entered (i.e., the first language or locale). Alternately (or in addition to associated region or locale), the online chat system may determine the query's language or locale based on an analysis of the query.

In some embodiments, the online chat system may translate the user's query into a second language (the primary language). The system may use machine translation techniques (e.g., using a translation engine) to translate the user's query. For example, the system may use a machine translation component within the system to translate the query, or it may use an online application programming interface (API) external to system to translate the query. The system may then transmit the translated query to the AI system which may determine a response. The AI system's response may be based on an analysis of one or more semantic properties of the translated query. For example, the AI system may determine an intent (e.g., using an intent engine) from the translated query and locate a node corresponding to the intent in the dialog tree. The node may include a node ID and the text of the response (also referred to as a label) in the second language. The AI system may then transmit its determined second-language response, including at least the node ID, to the online chat system.

In some embodiments, the online chat system may intercept the transmission of the second-language response from the AI system. For example, a component of the online chat system may intercept the second-language response rather than allowing its content to be displayed to the user in the online chat session. The online chat system may then determine a response in the first language (the user's language) based on the node ID in the second-language response. The first-language response may be a localized version (e.g., a response specific to the user's locale) of the second-language response, which may include a translation of the second-language response, or different text altogether.

In some embodiments, the online chat system may retrieve the response in the first language from a mapping (e.g., a key-value mapping) using a key, where the key includes the node ID and the value includes the text of the response in the first language. The mapping may be stored within the system, for example, in a high-speed cache, in a file on disk, or in a database. In some embodiments, the key may also include a representation of the language and/or the geographic region, or a locale string representing both a language and region, the mapped value is associated with.

The online chat system may then provide the response in the first language (i.e., the localized response) to the user device (e.g., as text or audio) via the chat robot. The user may continue interacting with the online chat system, sending more queries and receiving more responses through the online chat session.

Aspects of the process of populating the online chat system with data (e.g., configuring intents and responses in different languages) may also be improved by embodiments of the present disclosure, which help create and maintain the structure for entering localized versions of response text in various languages and/or for various locales. As described above, a single dialog tree based on the second language or locale (i.e., the primary language or locale) may be used in combination with a mapping between node IDs of the dialog tree and response text in different languages to support chat sessions in different languages and locales. Dialog may be added to the online chat system (e.g., by a human operator) using a knowledge management system. In some embodiments, the online chat system may create an entry in the primary language in the knowledge management system. In response, the online chat system may add a new node (including a node ID) in the primary language to the dialog tree and a new element in the mapping (using a key that includes the node ID) corresponding to the entry. For example, for an online chat system that supports English (i.e., American English), Spanish, and Japanese, an operator may create an entry in the knowledge management system in English that provides contact information for the service provider in response to a query from the user asking how to call the service provider. The knowledge management system may provide the interface for creating the entry, or the entry may be created using an interface at the AI system. The online chat system may create the corresponding node in the dialog tree in English based on the entry, and elements in the mapping for Spanish and Japanese (using keys that include the node ID from the node in the dialog tree). The elements may be blank (e.g., to be filled in later), or may initially be populated with a machine language translation of the English text. Alternately, the operator may create an entry in the knowledge management system in a language other than the primary language (e.g., the first language). The online chat system may, in response, add a new node (e.g., with blank or machine-translated text in the primary language) corresponding to the new entry to the dialog tree (including a node ID), and add a new element (in the non-primary language) in the mapping that includes the text entered by the operator, using a key that includes the node ID from the node added to the dialog tree. For example, the operator may create a Spanish-language entry in the knowledge management system that responds with information regarding how to dispute a transaction when a query is received asking how to dispute a transaction. The online chat system may add a node to the dialog tree with blank or machine-translated text, and add an entry in the mapping (using a key that includes the node ID from the newly added node) that includes the Spanish text entered by the operator. The online chat system may also add an entry in the mapping for a Japanese response (using the same node ID), with blank or machine-translated text. In some embodiments, the knowledge management system may pull the primary-language content of the dialog tree from the AI system and push it back to the AI system after the content is updated. The knowledge management system may then push new or updated translations to the mapping.

Creating and maintaining a dialog tree in a primary language or locale and sharing the structure of the tree among different languages or locales improves multilingual support in online chat systems by reducing the complexity and expense of running multiple instances of a chat system with multiple dialog trees. Furthermore, automating the propagation of additions to the dialog in one language or locale to other supported languages or locales (even through the use of machine-translated, blank, or place-holder data) may reduce human error and improve the reliability of the system and the overall user experience.

FIG. 1 illustrates an electronic transaction system 100 within which the online chat system may be implemented according to an embodiment of the disclosure. The electronic transaction system 100 includes a service provider server 130 associated with a service provider and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130 over the network 160. For example, the user 140 may use the user device 110 to log in to a user account with the service provider to access account services or conduct electronic transactions (e.g., account transfers or payments, purchase goods and/or services, sales of goods and/or services, receive payments of the sale, etc.) with the service provider server 130. Furthermore, the user 140 represented here may be a natural person, a group of people, a community, and/or a business entity. Examples of business entities include merchant sites, resource information sites, utility sites, real estate management sites, social networking sites, etc., which offer various items for purchase and process payments for the purchases.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, smart speaker, etc.

The user device 110, in one embodiment, includes a user interface (UI) application 112 (e.g., a web browser), which may be utilized by the user 140 to conduct electronic transactions (e.g., selling, shopping, purchasing, bidding, etc.) with the service provider server 130 over the network 160. In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110 may also include a chat client 170 for facilitating online chat sessions with a chat robot at the service provider server 130 (e.g., within the online chat module 132). The chat client 170 may be a software application executed on the user device 110 for providing a chat client interface to the user 140 and for exchanging (e.g., transmitting and receiving) messages with the chat robot. For example, during an online chat session, the chat client 170 may present a chat interface that enables the user 140 to input data (e.g., text data such as utterances, audio data, multimedia data, etc.) for transmitting to the chat robot. The chat interface may also present messages that are received from the chat robot, and messages that have been transmitted to the chat robot. In some embodiments, the messages may be presented on the chat client interface in a chronological order according to a chat flow of the online chat session. The chat client 170 may be an embedded application that is embedded within another application, such as the UI application 112. Alternatively, the chat client 170 may be a stand-alone chat client program that is detached from any other software applications executed on the user device 110.

The user device 110, in one embodiment, may include a voice assistant 172. The voice assistant may accept verbal utterances (i.e., speech) from the user and translate the utterances to text for transmission to the chat robot within the online chat module 132 at the service provider server 130. Alternately, the voice assistant 172 may transmit the verbal utterances as audio to the chat robot. The voice assistant 172 may use aspects of the chat client 170 to transmit messages to and receive messages from the chat robot. The voice assistant may also speak messages from the chat robot to the user 140.

The user device 110, in various embodiments, may include other applications 116 as may be desired in one or more embodiments of the present disclosure to provide additional features available to the user 140. For example, the applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be embedded within messages transmitted to the chat robot at the service provider server 130 via an online chat session, and the identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of requests. The user information may include user identification information. The user may also input data and information by speaking to the device 110 (e.g., through the voice assistant).

The service provider server 130, in one embodiment, may be maintained by an online service provider, which may provide services (e.g., selling of merchandise processing, performing electronic transactions, etc.). As such, the service provider server 130 may include a service application 138, which may be adapted to interact with the user devices (such as the user device 110) over the network 160 to facilitate the searching, selection, purchase, payment of items, and/or other services offered by the service provider server 130. In one example, the service provider server 130 may be provided by PayPal, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a login page, and is configured to serve the login page to users for logging into user accounts of the users to access various service provided by the service provider server 130. The web server 134 may also include other webpages associated with the different services offered by the service provider server 130. As a result, a user 140 may access a user account associated with the user and access various services offered by the service provider server 130, by generating HTTP requests directed at the service provider server 130.

The service provider server 130, in one embodiment, may be configured to maintain one or more user accounts (e.g., a buyer account, a seller account, etc.) in an account database 136, each of which may include account information associated with one or more users (e.g., the user 140 associated with user device 110). For example, account information may include private financial information of users and merchants, such as one or more account numbers, passwords, credit card information, banking information, digital wallets used, transaction history, or other types of financial information. In certain embodiments, account information also includes user purchase profile information such as account funding options and payment options associated with the user, payment information, receipts, and other information collected in response to completed funding and/or payment transactions. Account information may also include locale information associated with the user, for example, the country where the user resides and the user's preferred language.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

The service provider server 130 may also include an online chat module 132 that implements the functionality of the online chat system as disclosed herein. The online chat module 132 may include a chat robot and a chat session manager. The chat robot may provide automated assistance to a user 140 via an online chat session. The chat session manager may establish and manage a chat session between a chat client 170 and the chat robot. The chat session manager may also manage the chat flows of the online chat sessions. For example, as the chat session manager receives messages from the chat client 170 and the chat robot during an online chat session, the chat session manager may record the messages in the chat flow associated with the online chat session. The chat session manager may also store the chat flow in a persistent storage such that the chat flow may be accessed subsequently even after the online chat session is terminated. The online chat module 130 may communicate with the user 140 in multiple languages. For example, the online chat module 132 may receive a message from the user 140 via the chat client 170 in English (i.e., American English), transmit the message to the AI system 180 (assuming the AI system 180 has been configured with English-language data), receive a response in English from the AI system 180, and respond to the user via the chat client 170 in English. The online chat module may also receive messages from the user 140 in Spanish (or any other language), translate the message (e.g., using machine translation) to English, transmit the English-language message to the AI system 180, receive (or intercept) an English-language response from the AI system 180, determine a Spanish-language response corresponding to the English-language response as described herein, and transmit the Spanish language-response in a response to the user 140 via the chat client 170. The Spanish language response may be specific to the country or region in which the user 140 is located (e.g., based on the user's locale). For example, a user associated with the es_ES (Spanish-Spain) locale may receive a different Spanish-language response than a user associated with the es_MX (Spanish-Mexico) locale.

The service provider server 130 may, in an embodiment, communicate with the AI system 180. The AI system 180 may be part of the service provider server, housed within a network accessible privately by the service provider server, or external to the service provider (e.g., provided by a third party) and accessible over the network 160. The AI system 180 may process utterances (also referred to as messages or queries) transmitted by the user 140 through the chat client 170 and the online chat module 132, determine an intent corresponding to the utterance, and provide a response to the user 140 through the online chat module 132 and the chat client 170. The AI system 180 may include a dialog tree populated with possible intents and responses. The dialog tree may be created and maintained (e.g., by a human operator) using an interface provided by the AI system, an interface provided by the service provider server 130, or an interface provided by a knowledge management system (which may be part of or communicate with the service provider server 130). The AI system 180 may also provide an application programming interface (API) for programmatically creating and editing the dialog tree.

Figure 2:
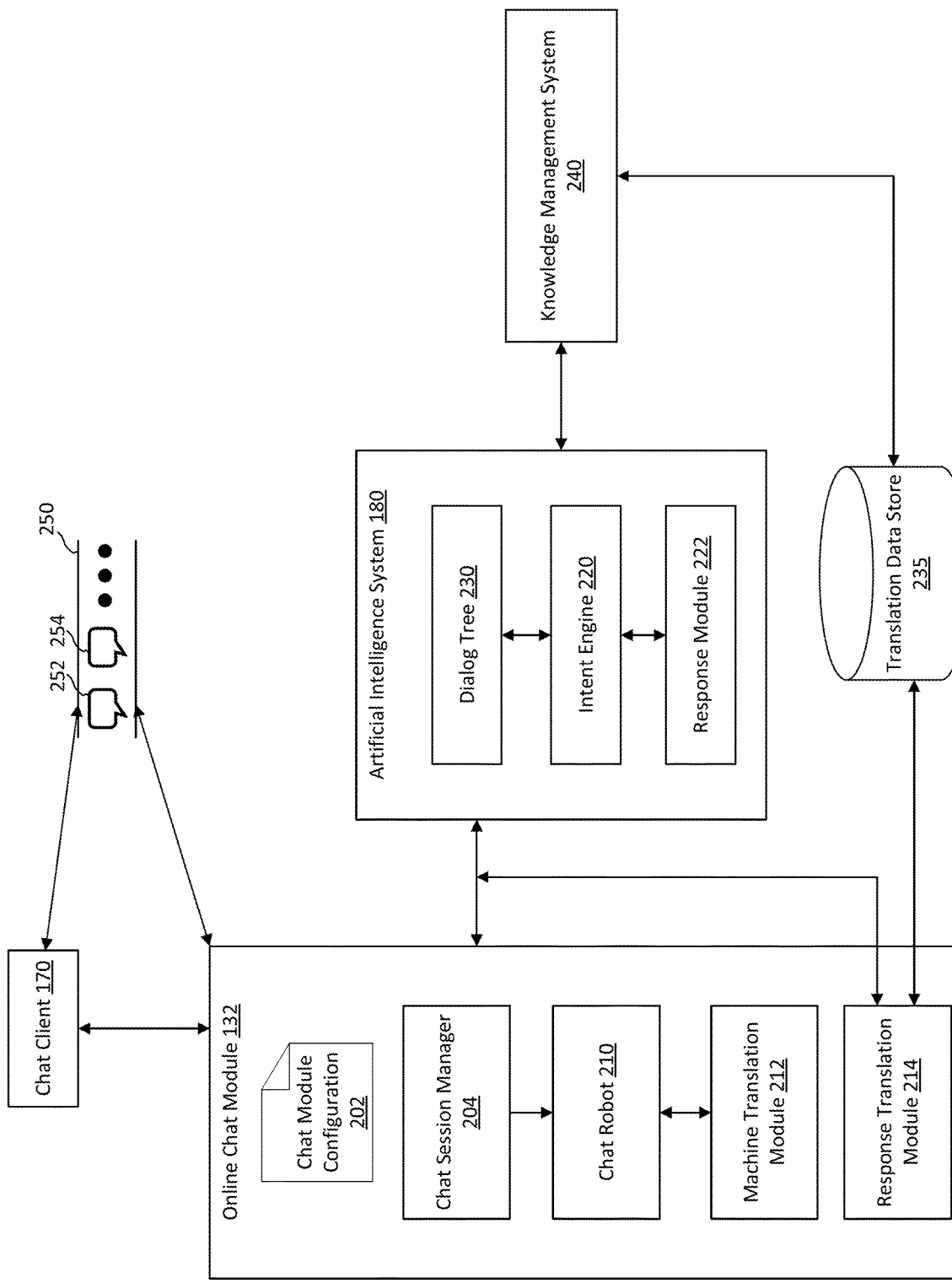
FIG. 2 is a block diagram illustrating an online chat module according to an embodiment of the present disclosure.

FIG. 2 illustrates a block diagram of a system that includes the online chat module 132 and the AI system 180 according to an embodiment of the disclosure. The online chat module 132 includes a chat module configuration 202, chat session manager 204, a chat robot 210, a machine translation module 212, and a response translation module 214. The chat module configuration 202 (which may include one or more files, databases, or other structures) may store a setting indicating the primary language or locale of the AI system 180. The chat module configuration 202 may also store a list of supported non-primary languages or locales (i.e., combinations of languages and countries or geographic regions) for which the online chat module may provide localized responses in the language corresponding to the locale. For example, if the primary language (i.e., the language of responses in the dialog tree 230) is American English, and the online chat module 132 additionally supports conversations in Canadian French, Mexican Spanish, and Japanese, the chat module configuration 202 may include the entries in the list of supported non-primary locales for fr_CA, es_MX, and jp_JP. The chat module configuration 202 may include entries in the same language (e.g., English) for different countries. For example, the service provider may offer a product in the United States that it does not offer in Canada, so that the response to a question from a user 140 should be different based on whether the user 140 is the United States or Canada. As the primary language is English (i.e., American English), the chat module configuration 202 may including a setting indicating that the primary language or locale is en_US, and include an entry (en_CA) for Canadian English in the list of supported non-primary languages or locales. As a result, a Canadian user asking a question in English may receive a different response than an American user asking the same question in English. The locale strings provided throughout this disclosure are examples only, and different formats or representations of locales may be used.

In some embodiments, the chat module configuration 202 may include a language-mismatch flag indicating that the language or locale associated with a chat session 250 does not match the primary language or locale. The chat module configuration 202 may also store a setting indicating the language or locale associated with the chat session 250. In some embodiments, the chat module configuration 202 may include a database, file, or other structure for settings common to all conversations handled by the online chat module 132 (e.g., the primary language or locale of the AI system 180 and the list of supported non-primary languages or locales), and session-specific or user-specific databases, files, or other structures for settings specific to a user 140 or chat session 250 (e.g., the language-mismatch flag, the language or locale associated with a specific chat session 250, or a conversation ID identifying a particular session).

The chat session manager 204 may establish and manage an online chat session 250 between a chat client 170 (e.g., on a user device 110) and the chat robot 210. The chat session manager 204 may manage the chat flow of the online chat session 250, receiving messages (e.g., the message 252) from the chat client 170 and delivering them to the chat robot 210, as well as receiving messages (e.g., the message 254) from the chat robot 210 and transmitting them to the chat client 170. The chat session manager 204 may also store the chat flow in a persistent storage such that the chat flow may be accessed subsequently even after the online chat session is terminated. In some embodiments, the online chat session 250 may be implemented as a stateless web service, while still appearing as a chat session the user (e.g., with messages organized in a conversation). For example, the online chat system may not maintain an active chat session with a user, but may maintain contextual information about a conversation and include sufficient information with each chat message to associate each chat message with a conversation. The chat session manager 204 may use a conversation ID to associate each message with the conversation (e.g., with the chat session 250). For example, when the user 140 initiates the chat session 250, the chat session manager may generate a conversation ID for the chat session 250 and provide it to the chat client 170 and the chat robot 210. Each message sent by chat client 170 and the chat robot 210 may include the conversation ID. In some embodiments, the chat session manager 204 may store the conversation ID in the chat module configuration 202.

In some embodiments, the chat robot 210 may receive messages (e.g., the message 252) from the chat client 170 through the chat session manager 204, and transmit responses (e.g., the message 254) to the chat client 170 through the chat session manager 204. The chat robot 210 may communicate with an AI system 180 to determine responses for messages received from the chat client 170. The AI system may include an intent engine 220, a response module 222, and a dialog tree 230. The dialog tree 230 may include a number of intent nodes corresponding to user intents and possible responses related to the user intents in a single primary language (e.g., American English) or locale (English-United States). A user intent represents an intended meaning of an utterance from a user 140, i.e., the information the user 140 is requesting from the service provider. Each intent node may have child nodes corresponding to different entities, where the entities are determined from the user's utterance and help narrow down the information requested as part of the intent. For example, the message "How can I reach you?" may correspond to an intent for requesting contact information from the service provider. If the message were phrased more specifically, for example, "How can I call you?", the intent would remain the same, but the added information suggests the message corresponds to a phone-number entity. In addition to intent information (e.g., the intent name and what words or phrases may suggest the intent), each node may also include a node ID uniquely identifying the node in the dialog tree 230, and response text (also referred to as a label) in the primary language. The intent engine 220 may determine or predict an intent based on a message 252 from a user 140 and locate a node corresponding to the intent in the dialog tree 230. The response module 222 may then prepare a response using the response text in the node for transmission to the online chat module 230. The dialog tree 230 may be created by a human operator, who configures the various possible intents and responses in a human language using an interface provided by the AI system (or the service provider server 130 or knowledge management system 240). For example, the dialog tree 230 may be configured in English (i.e., American English), and the chat robot 210 may receive a message 254 in English transmitted by a user device 110 through the chat client 170. The chat robot 210 may transmit the message to the AI system 180 where the intent engine 220 may determine/predict the user's intent from the message, locate a node corresponding to the intent in the dialog tree 230, and communicate with the response module 222 to prepare an appropriate response using the response text in the node. The response from the dialog tree may include the node ID and English-language response text. The AI system 180 may then transmit the response (e.g., in JavaScript Object Notation (JSON) format) to the chat robot 210. The chat robot 210 may then prepare a message 254 with the text of the response and transmit it to the chat session manager 204 for delivery to the chat client 170.

Because the online chat module 132 is designed to facilitate multilingual chat support, a more involved process may be used when the user 140 transmits a message in a language other than the primary language for which the dialog tree 230 is configured. For example, the user 140 may initiate a chat session 250 with the chat robot 210 through the chat client 170. The chat session manager 204 may generate a conversation ID, which may be used to associate each message in the conversation with the session. For example, when the user 140 initiates the session 250, the chat session manager may send a message (e.g., a welcome message, or a message with no text content for the user 140) to the chat client 170 that includes the conversation ID. The chat client 170 may then include the conversation ID in every message it transmits to the chat robot 210. Similarly, the chat session manager 204 may communicate the conversation ID to the AI system 180 (e.g., by including it in queries to the AI system 180), and the AI system 180 may include the conversation ID in every response it transmits to the chat robot 210. In other words, every message or response transmitted to the online chat module 132 or from the online chat module 132 as part of the session or conversation may include to the conversation ID. The chat session manager 204 may also associate the chat session (i.e., the conversation) with a locale. For example, the user 140 may be associated with an account in the account database 136, and the account information may include locale setting (i.e., a language and region) for the user 140 (e.g., provided by the user when registering for an account, or determined based on an address provided by the user). The locale setting associated with the user's account may be transmitted to the online chat module 132 in a header (e.g., an HTTP header) when the user initiates the session, and the chat session manager 204 may maintain the locale as part of the chat session (e.g., as metadata) and/or store the locale in the chat module configuration 202. In some embodiments, the locale may also be determined from location and/or language data provided by the user device 110 through the chat client 170. For example, the location and/or language data may be derived from GPS coordinates or Wi-Fi-based geolocation information from the user device 110, through information provided in an HTTP request (e.g., in the Accept-Language header), or directly from the user 140 (e.g., by the user 140 having selected a language and/or region through a user interface element when initiating the chat session). The location data may also be determined by the web server 134. For example, the web server 134 may use the IP address from which the user device 110 initiated the chat session to determine which internet service provider (ISP) assigned the IP address and determine location data based on the location of the ISP. Alternately, the web server 134 may determine the location and/or language based on the version of the web site from which the user device 110 initiated the chat session. For example, if the chat session was initiated from www.paypal.com/jp, the web server 134 may determine that the locale is jp_JP (i.e., the location is Japan and the language is Japanese). In some embodiments, the locale may be determined by analyzing a message 252 from the user 140. For example, the online chat module 132 may apply natural language processing techniques to identify the language of the user's query and a region associated with the language (e.g., by identifying the dialect, or based on location information as described above).

The user may then transmit the message 252 in a language or locale other than the primary language or locale. The message 252 may be sent via that chat client 170 to the chat session manager 204, which may deliver the message to the chat robot 210. The chat robot 210 may determine that the language or locale of the message 252 is not the primary language or locale, for example, based on the locale associated with the chat session 250 (e.g., by determining if the locale associated with the chat session is present in the list of supported non-primary languages or locales in chat module configuration 202, which would indicate a language other than the primary language), or based on a semantic analysis of the message 252. In some embodiments the chat session manager 204 (e.g., at the request of the chat robot 210) may set a language-mismatch flag in the chat module configuration 202 (i.e., in a session-specific file of the chat module configuration 202) indicating that the user language or locale does not match the primary language or locale. The chat robot 210 may then communicate with the machine translation module 212 to obtain a machine translation of the message 252 in the primary language. The machine translation module 212 may be within the online chat module 132, or may be part of a service external to the online chat module 132. In some embodiments, if the language-mismatch flag in the chat module configuration 202 has been set, the chat session manager 204 may activate the response translation module 214 to intercept responses from the AI system 180 as described below. The chat session manager 204 may provide the response translation module with the conversation ID corresponding to the message 252 when activating the response translation module 204. The chat robot may then transmit the machine-translation of the message 252 to the AI system 180. The intent engine 220 may determine the intent corresponding to the message 252 and locate a node corresponding to the intent in the dialog tree, and the response module 222 may prepare a response including the node ID and primary-language response text from the node. The AI system 180 may then transmit the primary-language response to the online chat module 132.

The response translation module 214 may intercept the primary-language response from the AI system 180 (including the associated conversation ID) in order to provide an appropriate response in the same language and/or corresponding to the same locale (i.e., the user's language or locale) the message 252 was originally transmitted in. In some embodiments, the response translation module 214 may intercept the response based on the language-mismatch flag being set. For example, the response translation module 214 may have been activated by the chat session manager 204 prior to the chat session manager 204 transmitting the message 252 to the AI system 180 based on the language-mismatch flag being set. The chat session manager 204 may have provided the conversation ID to the response translation module 214 during activation, and the response translation module 214 may identify and intercept incoming responses based on the conversation ID. In some embodiments, the response translation module 214 may listen for all responses from the AI system 180 and determine whether to intercept each response. For example, as the primary-language response from the AI system 180 arrives at the online chat module 132, the response translation module 214 may use the conversation ID included with the primary-language response to request the user's language or locale (i.e., the language or locale associated with the chat session) from the chat session manager 204, or the response translation module 214 may retrieve the user's language or locale from the chat module configuration 202. The response translation module 202 may then may determine that the language or locale corresponding to the user's query is present in the list of supported non-primary languages or locales stored in the chat module configuration 202. For example, the response translation module 214 may search the list of supported non-primary languages or locales in the chat module configuration 202 and determine that the user's language or locale is present. If the user's language or locale is present in the list, the response translation module 214 may intercept the primary-language response from the AI system 180 and determine a response corresponding to the user's language or locale using the translation data store 235.

The translation data store 235 may store a mapping between node IDs corresponding to responses in the dialog tree 230 (e.g., in a database, or in one or more files), and localized versions of those responses for different languages locales. The node ID may be used in conjunction with an identifier corresponding to a language, region, and/or locale (i.e., language-region pair) to identify a particular response translation. In other words, a node ID and identifier pair may form a key. For example, a Spanish translation of the response with node ID 10 may be stored with the key <10, es> where "es" is the identifier corresponding to Spanish, or <10, es_MX> where "es_MX" identifies the locale corresponding to Spanish and Mexico. Different localized responses in different variations of the same language may also be stored in the translation data store 235 and may be retrieved using the locale in combination with the node ID as the key. For example, a Spanish version of the response for a user 140 in Colombia may be stored with the key <10, es_CO> (where "CO" refers to Colombia), and a Spanish version for users in Mexico may be stored with the key <10, es_MX> (where "MX" refers to Mexico). In some embodiments localized versions of the responses may be stored in different files or structures on a per-language or per-region-or-country basis so that a node ID may suffice to identify a translation within a single-language file or structure. For example, the Spanish translation corresponding to node ID 10 may be stored in a file or structure containing only Spanish translations and retrieved using only the node ID (10). In some embodiments, the translation data store 235 may comprise a high-speed cache, which may be backed up by a persistent storage medium.

Upon intercepting the response from the AI system 180, the response translation module 214 may extract the node ID from the primary-language response received from the AI system 180 and determine a localized version of the primary-language response (i.e., response text in the user's language or locale) based on the node ID. For example, the response translation module 214 may determine a key corresponding to the localized version of the primary-language response. The key may include the node ID and an identifier corresponding to the language or locale of the localized response (corresponding to the user's language or locale). The response translation module 214 may extract the node ID from the primary-language response and retrieve the user's language or locale to determine the identifier (e.g., a locale string or language code) and form the key. For example, the response translation module 214 may request, using the conversation ID included with the primary-language response, the user's language or locale from the chat session manager 204. Alternately, the response translation module may retrieve the user's language or locale from the chat module configuration 202. The response translation module 214 may then combine the node ID with the identifier to form the key, and use the key to retrieve to localized response from the mapping stored in the translation data store 235. For example, where the node ID is 10 and the locale associated with the chat session is es_ES (corresponding to Spanish and Spain), they key may be the pair <10, es_ES>. Where the translation data store 235 divides the localized responses into different files or structures corresponding to different languages and/or regions, the node ID may suffice to retrieve the appropriate translation. For example, where the locale associated with the chat session is es_MX, the response translation module 214 may determine a file on the translation data store 235 corresponding to the es_MX locale and retrieve the localized response text using only the node ID as the key. The response translation module 214 may then transmit the localized response text to the chat robot 210, which may prepare the message 254 with the localized response text and transmit it to the chat client 170. In some embodiments, the response translation module 214 may clear the language-mismatch flag after transmitting the localized response text to the chat robot 210 (or at any time after intercepting the primary-language response from the AI system 180).

In some embodiments, a knowledge management system 240 may be used to populate the AI system 180 and translation data store 235 with content. For example, the knowledge management system 240 may pull the primary-language content from the AI system 180 and provide it to a human operator (e.g., an employee of the service provider) for localization into other languages and/or regions. The knowledge management system 240 may then push the localized content to the translation data store 235. The knowledge management system 240 may also provide an interface for creating new responses in the primary language or locale (e.g., for populating the dialog tree 230) and in other languages or locales. For example, knowledge management system 240 may allow an operator (or automated process) to create a new entry with response text in the primary language. The knowledge management system 240 may communicate with the AI system 180 to add a new node (including a node ID) with the response text in the primary language to the dialog tree. The knowledge management system 240 may then create a new element in the mapping (using a key that includes the node ID) on the translation data store 235 corresponding to the new entry. The knowledge management system 240 may populate the new element in the mapping with a machine translation of the response text and/or allow the operator to provide a translation of the response text. Similarly, the knowledge management system 240 may create (e.g., through operator input or an automated process) a new entry in a non-primary language or locale. The knowledge management system 240 may then communicate with the AI system 180 to create a new node (with a new node ID) in the dialog tree in the primary language corresponding to the new element in the translation data store 235. The new node may be populated with a primary-language machine translation of the response text, or blank or placeholder data. The knowledge management system 240 may then create a new element in the mapping at the translation data store 235 with response text in the non-primary language, using a key that includes the new node ID. The knowledge management system 240 may then communicate with the AI system 180 to create a new node in the dialog tree in the primary language corresponding to the new element in the translation data store 235. The new node may be populated with a primary-language machine translation of the response text, or blank or placeholder data. The knowledge management system 240 may also communicate with the AI system 180 to update existing nodes in the dialog tree 230, and/or update existing nodes in the translation data store 235.

For example, the knowledge management system 240 may create a new entry containing English-language response text in the knowledge management system 240 (e.g., in response to operator input). The knowledge management system may then communicate with the AI system 180 to update the dialog tree, creating a new node with a new node ID and the English-language response text. The knowledge management system 240 may retrieve the new node ID from the AI system 180 (or receive the new node ID in response to the creation of the node). The knowledge management system 240 may then create a new element for a non-primary language containing blank, placeholder, or machine translated text in the mapping in the translation data store 235 using a key that includes the new node ID. The knowledge management system 240 may create multiple elements in the mapping for each new primary-language entry. For example, after adding the English-language entry to the AI system 180, the knowledge management system may create elements in the mapping for French, Spanish, Japanese, and any other supported languages in the mapping. The elements may be populated with machine-translated responses or left blank (or with placeholder data) to be filled in later.

As another example, the knowledge management system 240 may create a new entry containing a Spanish-language response text (e.g., based on input from an operator). The knowledge management system may then communicate with the AI system 180 to update the dialog tree, creating a new node with a new node ID and machine-translated English-language response text, or blank or placeholder text. The knowledge management system 240 may retrieve the new node ID from the AI system 180 (or receive the new node ID in response to the creation of the node). The knowledge management system 240 may then create a new element with the Spanish-language response text in the mapping in the translation data store 235 using a key that includes the new node ID. As in the previous example, the knowledge management system 240 may create any number of elements (one for each supported language) for storing translations of the Spanish-language response text in other languages.

In some instances, a response may be appropriate in one language or locale but not another. For example, the service provider may offer a service in the United States that it does not offer in other countries. In such instances, when a new entry related to the service is added to the knowledge management system 240 in English, the knowledge management system 240 may communicate with the AI system 180 to create a node in the dialog tree, but may not create any elements with translated text in the translation data store 235. In another example, the service provider may offer a service exclusively in Japan. When an entry is created in the knowledge management system 240 in Japanese related to the Japan-only service, the knowledge management system 240 may communicate with the AI system 180 to create a node with a new node ID in the dialog tree 230 with blank or placeholder text (as there is no need for an English version of the text). The knowledge management system may then create a new element in the translation data store 235 with the Japanese-language text using a key that includes the new node ID. The knowledge management system 240, but not create elements in the translation data store 235 for other languages.

Figure 3:
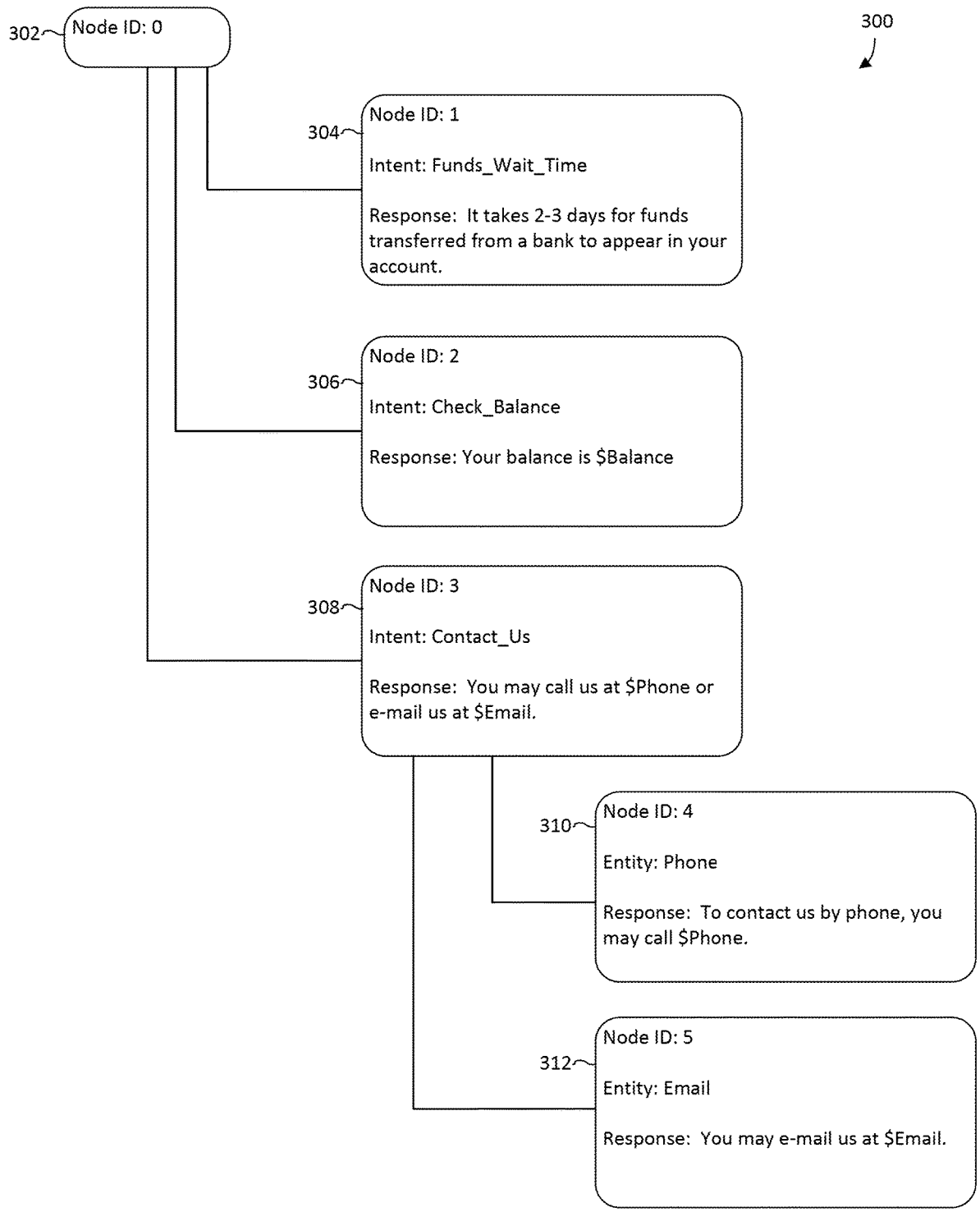
FIG. 3 illustrates and exemplary dialog tree according to an embodiment of the present disclosure.

FIG. 3 illustrates and exemplary dialog tree 300 according to some embodiments of the present disclosure. The dialog tree 300 (a specific example of the dialog tree 230 of FIG. 2) may be used by an AI system 180 to structure and store responses to user queries. As shown, the dialog tree 300 is populated in English (i.e., American English, corresponding to the en_US locale), but any language may serve as the primary language. Each node 302, 304, 306, 308, 310, and 312 may include a unique node ID. The dialog tree may include a root node 302, which may include text for an initial message to the user (e.g., a welcome message), or no text. The root node may have any number of child nodes 304, 306, and 308, which may have their own child nodes (e.g., node 308 has child nodes 310 and 312). A node 304, 306, or 308 may correspond to a user intent and include response text for responding to a query based on the user intent associated with query. Each intent may be associated with keywords or phrases that an AI system 180 may use to determine a user intent from a message received by the AI system 180. For example, the AI system 180 may receive the query "How long before a transfer appears in my account?" from a chat robot 210. The AI system may determine the message corresponds to the Funds_Wait_Time intent at node 304 with node ID 1. The AI system 180 may then send a response to the chat robot that includes the node ID and the response text (also referred to as a label), for example, {"nodeID": 1, "responseText": "It takes 2-3 days for funds transferred from a bank to appear in your account.", . . . }. A child node 308 corresponding to a user intent may have child nodes 310 and 312 corresponding to an entity, which provide more specific information regarding an intent. For example, if the AI system 180 receives the query "How do I contact you?", the AI system 180 may determine the query corresponds to the Contact Us intent at node 308 and respond with response text included in node 308 (replacing the $Phone and $Email variables with literal values). However, if the AI system receives the query "What's your phone number?", the AI system may still determine the query corresponds to the Contact Us intent, but based on the entity ("phone number"), it may respond with the response text from node 310, which corresponds to the Phone entity.

Figure 4:
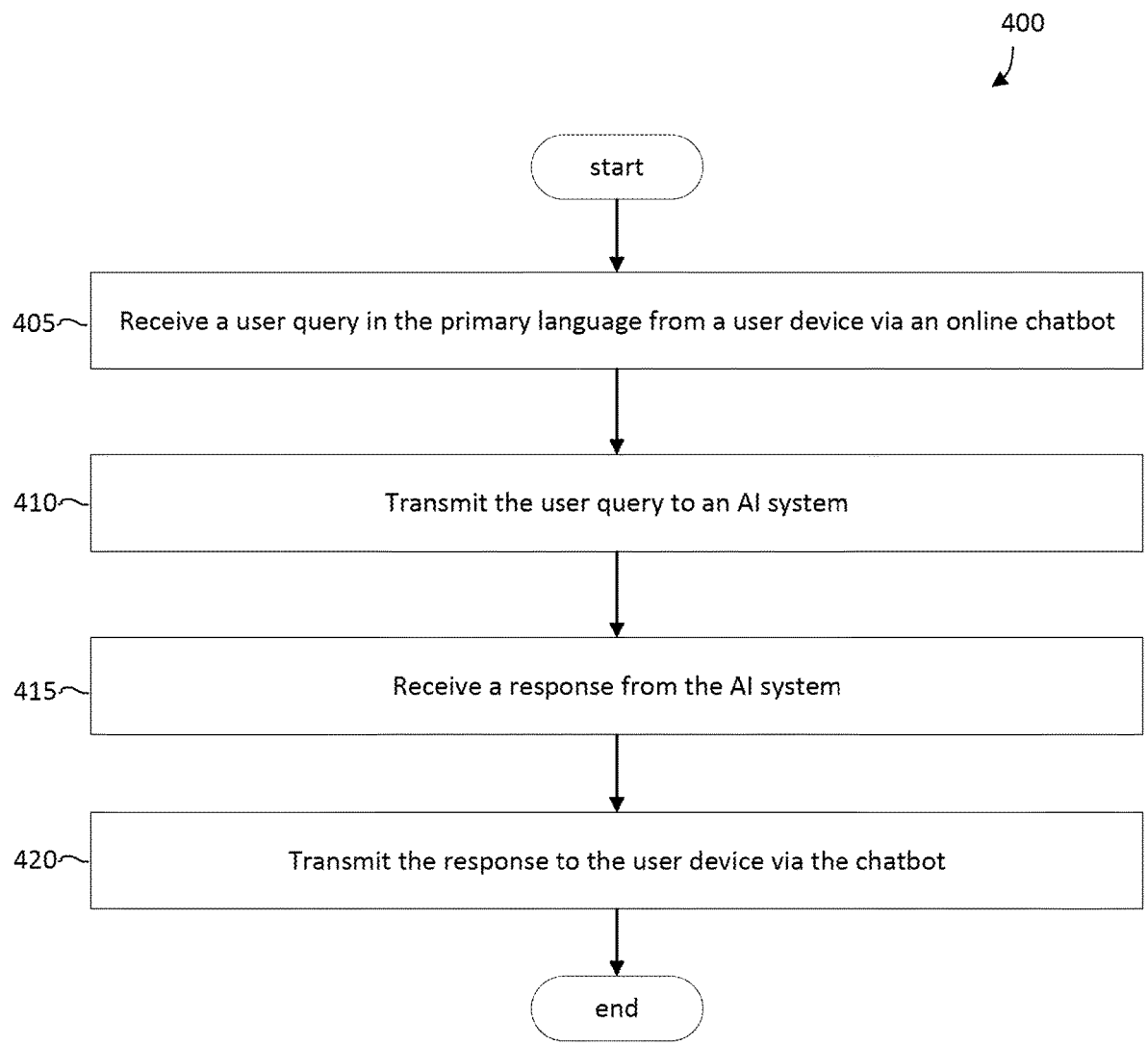
FIG. 4 is a flowchart showing a process of providing automated chat responses in an online chat system according to an embodiment of the present disclosure.
Figure 6:
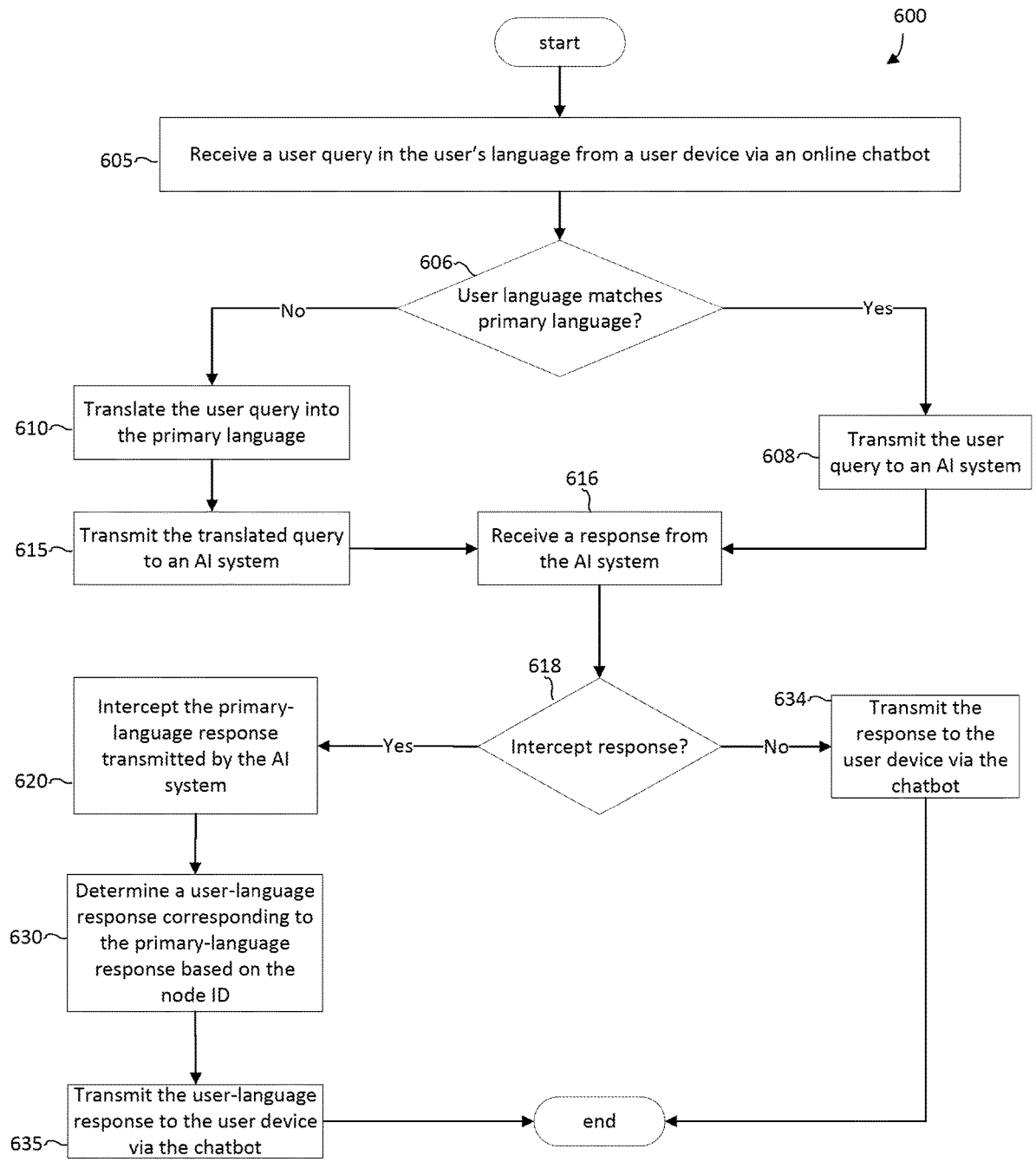
FIG. 6 is a flowchart showing a process of providing automated chat responses in an online chat system according to an embodiment of the present disclosure.

FIG. 4 illustrates a process 400 for providing automated chat responses in an online chat system according to an embodiment of the present disclosure when the online chat session receives a user query in the same language (i.e., the primary language) in which a dialog tree 230 of an AI system 180 is configured. In some embodiments, the process may be performed by an online chat module 132. Note that the steps described below with respect to FIGS. 4 and 6 are also described above and can be performed in a different order, combined, or omitted as appropriate in different embodiments. The process 400 begins at step 405 by receiving a user query in the primary language from a user device 110 via an online chat robot 210. For example, a user 140 may type or speak (e.g., via the voice assistant 172 which may transcribe the user's 140 speech into text) the query into the user device 110 in the primary language using a chat client 170. The query may be transmitted by the user device 110 to service provider server 130 and received by the chat session manager 204 at the online chat module 132. If a chat session between the user device 110 and the chat robot 210 does not yet exist, the chat session manager 204 may create one. The chat session manager may then add the query to the chat flow and send the query to the chat robot 210.

At step 410, the process (e.g., through the chat robot 210) may transmit the user query to an AI system 180 for chat robots that supports natural language processing. The AI system 180 may analyze the user query to determine the user's 140 intent (e.g., using the intent engine 222). For example, the AI system 180 may locate a node corresponding to the intent in the dialog tree 230 and prepare a response (e.g., with the response module 222), which may include the node ID of the node, and the primary-language response text. The AI system 180 may then transmit the response to the online chat module 132 (e.g., to the chat robot 210).

At step 415, the process (e.g., through the chat robot 210) may receive the response from the AI system. The chat robot 210 may then extract the primary-language response text from the response and transmit it to the chat client 170 on the user device 110.

Figure 5:
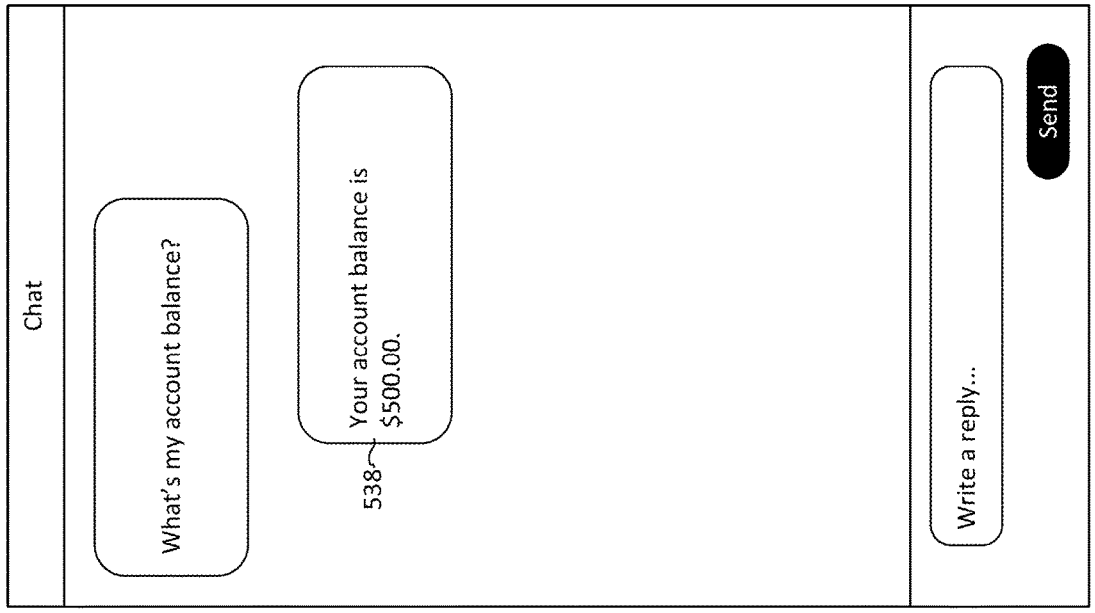
FIG. 5 illustrates an exemplary dialogue in an online chat system according to an embodiment of the present disclosure.
Figure 5:
Figure 5:
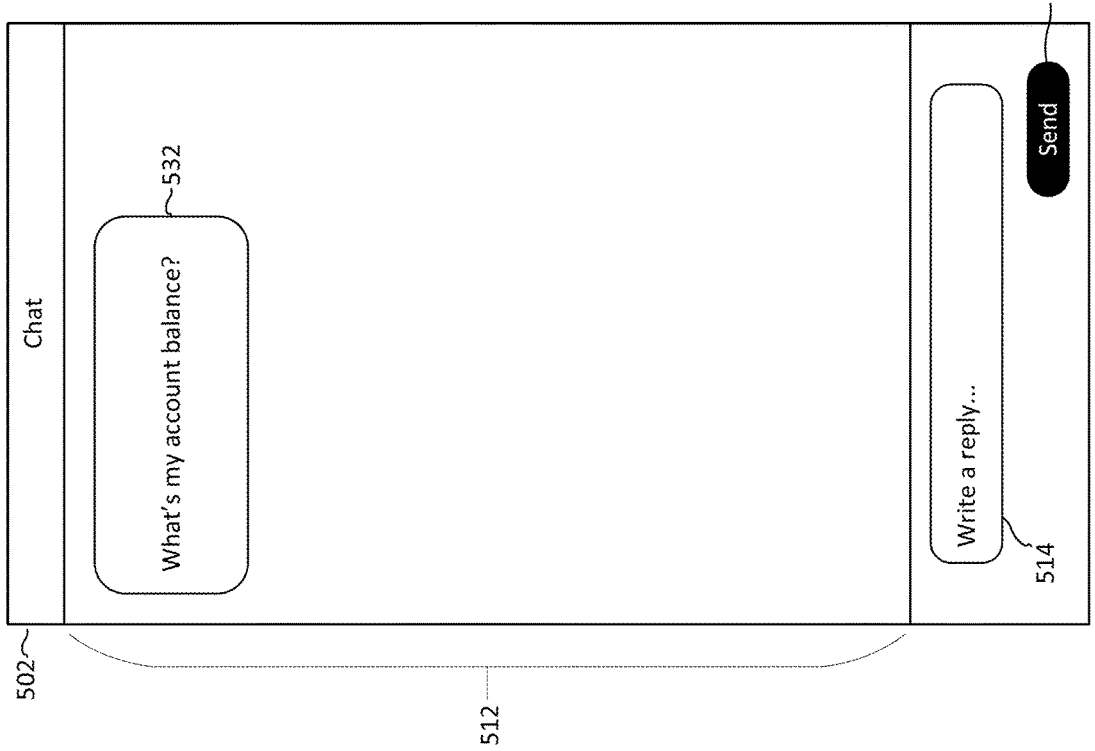

FIG. 5 illustrates an example chat interface 502 provided by the chat client 170. The chat interface 502 includes a chat presentation portion 512 for displaying messages and/or content from a chat flow associated with an online chat session. The chat flow may include messages exchanged between the chat client 170 and the chat robot 210. The chat interface 502 also includes an input portion 514 that enables the user 140 to input a message or query (e.g., an utterance that may include text data, audio data, multimedia data, etc.) for transmitting to the chat robot 210 and a 'send' button 516 for submitting a message typed in the input portion 514.

In this example, the AI system 180 includes the exemplary dialog tree 300 of FIG. 3 for which English is the primary language. The user 140 may transmit a message 532 in English, "What's my account balance?", by typing the message 532 in the input portion 514 and selecting the 'send' button 516. The user 140 may also speak the message, which may or may not be converted to text (e.g., using the voice assistant 172). In one example where the chat client 170 uses the chat protocol associated with the online chat module 132, when the user 140 selects the 'send' button 516, the message 532 is first transmitted by the chat client 170 to the online chat module 132. As described in step 405 of the process 400, the online chat module 132 may receive the message and insert it into the chat flow (e.g., using the chat session manager 204) associated with the chat session, and send the message 532 to the chat robot 204. As described in step 410 of the process 400, the chat robot 210 may transmit the message to the AI system 180. The intent engine 220 of the AI system 180 may determine that the intent of the message corresponds to the Check_Balance intent. For example, the AI system 180 may locate the node 306 corresponding to the Check_Balance intent in the dialog tree 300, and prepare a response (e.g., using the response module 222) that includes the node ID and the response text. The response may be {"nodeID": 2, "responseText": "Your balance is $Balance", . . . }. The AI system 180 may then transmit the response to the online chat module 132.

As described in steps 415 and 420 of the process 400, the online chat module may receive the response from the AI system 180 and send it (e.g., through the chat session manager 204) to the chat robot 210. The chat robot 210 may prepare a response message 538 by extracting the response text and replacing the $Balance variable in the response text with the actual balance ($500.00) of the user's 140 account by, for example, communicating with other components of the service provider server 130 to retrieve the balance from the account database 136. The chat robot 210 may then transmit the response message 538 to the chat client 170 (e.g., through the chat session manager 204). The response message 538 may then be displayed in the chat presentation portion 512 of the chat interface 502 on the user device 110.

FIG. 6 illustrates a process 600 for providing automated chat responses in an online chat system according to an embodiment of the present disclosure when the online chat session receives a user query in the user's language or locale, which may be different from the primary language (i.e., the language for which the dialog tree 230 of the AI system 180 is configured). In some embodiments, the process may be performed by an online chat module 132. The process 600 begins at step 605 by receiving a user query in the user's language from a user device 110 via an online chat robot 210. For example, a user 140 may type or speak (e.g., via the voice assistant 172 which may transcribe the user's 140 speech into text) the query into the user device 110 using a chat client 170. The query may be transmitted by the user device 110 to service provider server 130 and received by the chat session manager 204 at the online chat module 132. If a chat session between the user device 110 and the chat robot 210 does not yet exist, the chat session manager 204 may create one. The chat session manager may then add the query to the chat flow and send the query to the chat robot 210. The chat session may be stateless, for example, the chat session manager 240 may not maintain an active chat session with a user, but may maintain contextual information about a conversation and include sufficient information with each chat message to associate each chat message with a conversation. The chat session manager 204 may use a conversation ID to associate each message with the conversation (i.e., with the chat session 250). For example, the chat session manager may generate a conversation ID for the chat session and provide it to the chat client 170 and the chat robot 210. Each message sent by chat client 170 and the chat robot 210 may include the conversation ID. In some embodiments, the chat session manager 204 may store the conversation ID in the chat module configuration 202.

In some embodiments, the chat session may be associated with a language, geographic region, or locale (i.e., a combination of language and geographic region or country). For example, the chat session manager 204 may receive the locale in a header (e.g., an HTTP header) when the user initiates the chat session or sends a message. The chat session manager 204 may store the locale (e.g., in metadata) as part of the chat session. For example, the user 140 may be associated with an account in the account database 136, and the account information may include locale setting (i.e., a language and region) for the user 140 (e.g., provided by the user when registering for an account, or determined based on an address provided by the user). The locale setting associated with the user's account may be transmitted to the online chat module 132 in a header (e.g., an HTTP header) when the user initiates the session, and the chat session manager may maintain the locale as part of the chat session (e.g., as metadata or contextual information about the chat session). In some embodiments, the locale may also be determined from location and/or language data provided by the user device 110 through the chat client 170. For example, the location and/or language data may be derived from GPS coordinates or Wi-Fi-based geolocation information from the user device 110, through information provided in an HTTP request (e.g., in the Accept-Language header), or directly from the user 140 (e.g., by the user 140 having selected a language and/or region through a user interface element when initiating the chat session). The location data may also be determined by the web server 134. For example, the web server 134 may use the IP address from which the user device 110 initiated the chat session to determine which internet service provider (ISP) assigned the IP address and determine location data based on the location of the ISP. Alternately, the web server 134 may determine the location and/or language based on the version of the web site from which the user device 110 initiated the chat session. For example, if the chat session was initiated from www.paypal.com/jp, the web server 134 may determine that the locale is jp_JP (i.e., the location is Japan and the language is Japanese). In some embodiments, the locale may be determined by analyzing the user query. For example, the online chat module 132 may apply natural language processing techniques to identify the language of the user query and a region associated with the language (e.g., by identifying the dialect, or based on location information as described above).

At step 606, the online chat module 132 may determine whether the user language or locale is different from the primary language or locale. For example, the chat robot 210 may communicate with the chat session manager 204 to retrieve the language or locale associated with the chat session (or retrieve the language or locale directly from the chat module configuration 202) and determine if the language or locale associated with the chat session matches the language or locale (i.e., language and region) associated with the dialog tree 230 of the AI system 180. For example, the chat robot 210 may determine whether the languages or locales match by checking the chat module configuration 202 for an entry in the list of supported non-primary languages or locales corresponding to the language or locale associated with the chat session. An entry in list of supported non-primary languages or locales corresponding to chat-session language or locale may indicate that the chat-session language or locale is different than the primary language or locale. In some embodiments, the online chat module 132 may perform a semantic analysis of the query (e.g., using the machine translation module 212 and/or natural language processing techniques) to determine the user's language or locale (i.e., the language or locale associated with the chat session) then compare the user language or locale with the primary language or locale (e.g., retrieved from the chat module configuration 202) to determine if they match. In some embodiments, the chat session manager may store an indication that the user language or locale does not match the primary language or locale. For example, the chat session manager 204 may set a language-mismatch flag in the chat module configuration 202 (e.g., in a session-specific file of the chat module configuration) indicating that the user language or locale does not match the primary language or locale. The chat session manager 204 may also store a setting indicating the user language or locale in the chat module configuration 202. If the user language or locale matches the primary language or locale, the process may proceed to step 608. Otherwise, the process may proceed to step 610.

At step 608, the process 600 may transmit the user query (now determined to correspond to the language or locale of the AI system 180) to the AI system 180. For example, the chat robot 210 may use the chat session manager 204 to transmit the user query to the AI system 180. The chat session manager 204 may include a conversation ID in the transmission indicating to which conversation (i.e., chat session) the message belongs. The AI system 180 may then determine a response based on the user query. For example, the AI system's 180 response may be based on an analysis of one or more semantic properties of the user query. The AI system 180 may determine the user's 140 intent from the user query, locating a node corresponding to the intent in the dialog tree 230. For example, the AI system 180 may determine the intent and any related entities using the intent engine 220. The AI system 180 may then search dialog tree 230 and locate a node corresponding to the intent and any entity. The node may include a node ID and the text of the response in the primary language or locale, which in this case, is also the user's primary language or locale. The AI system 180 may prepare a response (using the response module 222) including the node ID and the response text. The AI system 180 may then transmit the response, including the conversation ID, to the online chat module 132, and the process may continue to step 616.

Returning to step 606, if the process 600 determines that the language or locale of the user query does not match the primary language or locale (of the AI system 180), the process 600 may continue to step 610. At step 610, the process 600 may translate the user's query from the user language to the primary language. For example, the chat robot 210 may send the query to the machine translation module 212, which may translate the query into the primary language using machine translation techniques. The machine translation module 212 may then send the translated query back to the chat robot 210. In some embodiments, the chat robot 210 may use an external service to obtain the translation of the query (e.g., an online machine translation API).

At step 615, the process 600 may transmit the translated query to the AI system 180. For example, the chat robot 210 may use the chat session manager 204 to transmit the translated query to the AI system 180. The chat session manager 204 may include a conversation ID in the transmission indicating to which conversation (i.e., chat session) the message belongs. In some embodiments, the chat session manager 204 may activate the response translation module prior to transmitting the user query to the AI system 180. For example, the chat session manager may check if the language-mismatch flag in the chat module configuration 202 is set and activate the response translation module 214 to intercept a response to the user query from the AI system as described in steps 618 and 620. The chat session manager 204 may provide the response translation module 204 with the conversation ID when activating the response translation module 204. After the receiving the translated query, the AI system 180 may then determine a response based on the translated query. For example, the AI system's 180 response may be based on an analysis of one or more semantic properties of the translated query. The AI system 180 may determine the user's 140 intent from the translated query, locating a node corresponding to the intent in the dialog tree 230. For example, the AI system 180 may determine the intent and any related entities using the intent engine 220. The AI system 180 may then search dialog tree 230 and locate a node corresponding to the intent and any entity. The node may include a node ID and the text of the response in the primary language or locale. The AI system 180 may prepare a response (using the response module 222) in the primary language or locale. The response may include the node ID and the response text. The AI system 180 may then transmit the response, including the conversation ID received with the translated query, to the online chat module 132.

At step 616, the process 600 may receive a response from the AI system 180 in the primary language or locale. The response may arrive at the chat session manager 204, or be intercepted by the response translation module 214 as described in steps 618 and 620.

At step 618, the process 600 may determine whether to intercept the response from the AI system 180, which may include the conversation ID identifying the conversation or session to which the message belongs. In some embodiments, the response translation module 214 may determine to intercept the response based on the language-mismatch flag being set, as described in steps 606 and 615. For example, the response translation module 214 may have been activated by the chat session manager 204 prior to the chat session manager 204 transmitting the user query to the AI system 180, and the chat session manager 204 may have provided the conversation ID to the response translation module 214 during activation. The response translation module 214 may then identify and intercept incoming responses based on the conversation ID. In some embodiments, the response translation module 214 may listen for all responses from the AI system 180 and determine whether to intercept each response. For example, as the response arrives at the online chat module 132, the response translation module 214 may use the conversation ID to request the user's language or locale (i.e., the language or locale associated with the chat session) from the chat session manager 204, or the response translation module 214 may retrieve the user's language or locale from the chat module configuration 202. The response translation module 202 may then may determine that the language or locale corresponding to the user's query is present in the list of supported non-primary languages or locales stored in the chat module configuration 202. For example, the response translation module 214 may search the list of supported non-primary languages or locales in the chat module configuration 202 to determine if the user's language or locale is present. If the user's language or locale is present in the list, the response translation module 214 may determine to intercept the response from the AI system 180. If the response translation module 214 determines that the response should not be intercepted (i.e., because the language or locale of the user's query matches the primary language), or if the response translation module 618 was never activated (e.g., because the language-mismatch flag was never set), the response from the AI system 180 may continue to the chat robot 210, and the process 600 may proceed to step 634. At step 634, the process (e.g., through the chat robot 210 and the chat session manager) may prepare a response message including the primary-language response text from the AI system 180 and transmit it to the user device (e.g., through the chat client 170). Otherwise, if the response translation module 214 determines to intercept the response from the AI system 180, the process may process may continue to step 620. At step 620, the process 600 may intercept the response from the AI system 180, rather than allowing it to be delivered to the chat robot 210. The process 600 may then continue to step 630.

At step 630, upon intercepting the primary-language response from the AI system 180, the process 600 may extract the node ID from the primary-language response and determine a localized version of the primary-language response (i.e., response text in the user's language or locale) based on the node ID. For example, the response translation module 214 may determine a key corresponding to the localized version of the primary-language response, which may include the node ID included in the primary-language response from the AI system 180 and the language or locale of the localized response (corresponding to the user's language or locale). The response translation module 214 may extract the node ID from the primary-language response and retrieve the user's language or locale to determine the key. For example, the response translation module 214 may request, using the conversation ID included with the primary-language response, the user's language or locale from the chat session manager 204. Alternately, the response translation module 214 may retrieve the user's language or locale from the chat module configuration 202. The response translation module 214 may then use the key to retrieve to localized response from a mapping stored in the translation data store 235. The mapping may map keys comprising a node ID and locale information (e.g., locale, language, and/or geographic region) to localized versions of the primary-language response text. The localized versions of the response text may be translations of the primary-language response text, or context-specific responses appropriate to the user 140 or the user's locale. For example, the meaning of the localized response and the primary-language response may be different (e.g., based on whether a service or product is offered in some regions and not others). The mapping may be stored in the translation data store 235 as a file, database, or other structure. In some embodiments, localized versions of the responses may be stored in different files or structures on a per-language basis so that a node ID may suffice to identify a translation within a single-language file or structure. For example, the response translation module 214 may determine a file on the translation data store 235 corresponding to the user's language or locale and retrieve the localized response text using only the node ID. The response translation module 214 may then transmit the localized response text to the chat robot 210, which may prepare a localized response for the user 140. In some embodiments, the response translation module 214 may clear the language-mismatch flag after transmitting the localized response text to the chat robot 210 (or at any time after intercepting the response from the AI system 180).

At step 635, the process 600 may transmit a localized response message to the user device 110. For example, the chat robot 210 may prepare the localized response message including the localized response text and transmit the localized response message (e.g., via the chat session manager 204) to the chat client 170, which may display or speak the response to the user.

Figure 7:
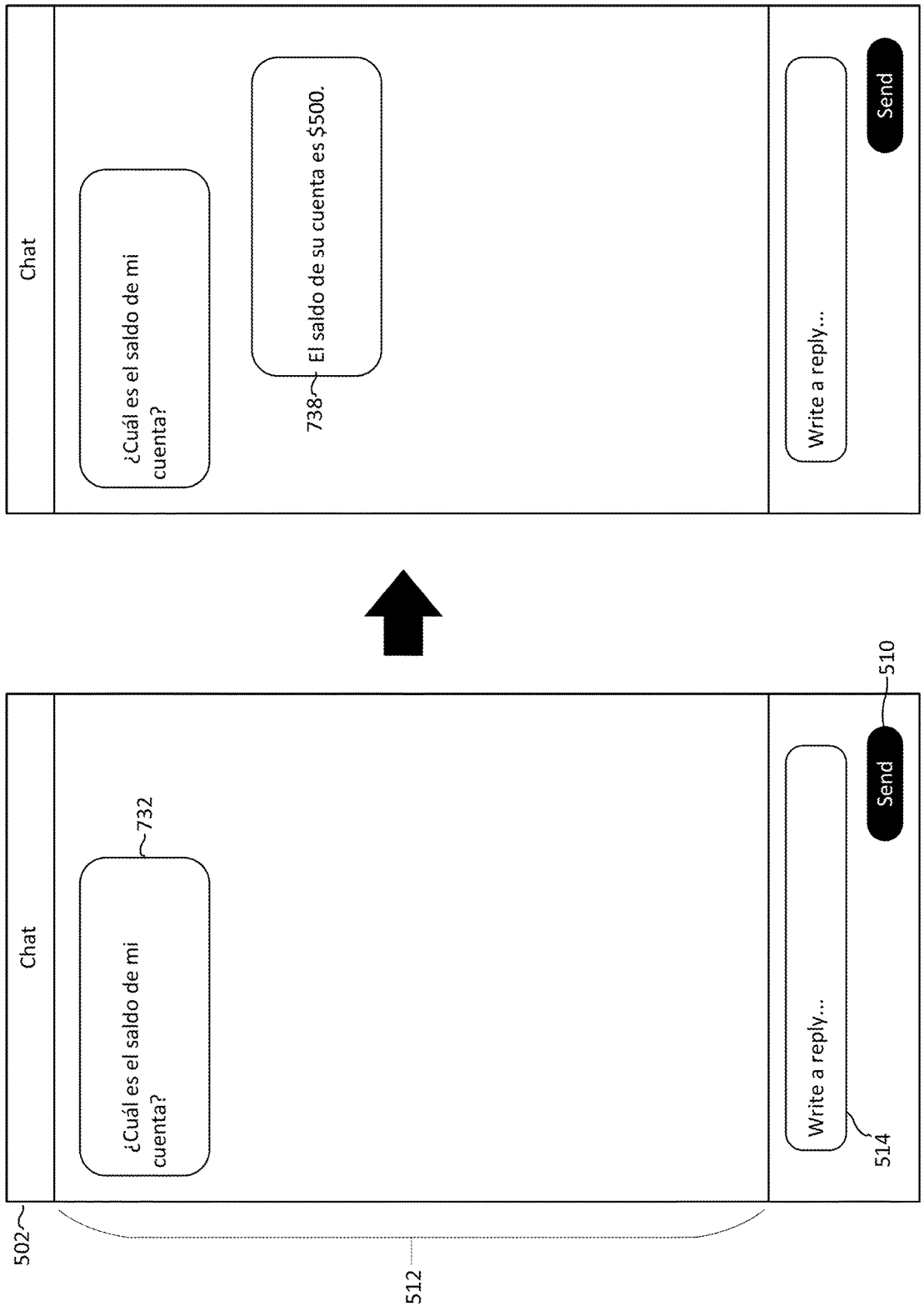
FIG. 7 illustrates an exemplary dialogue in an online chat system according to an embodiment of the present disclosure.

FIG. 7 illustrates the example chat interface 502 (of FIG. 5) providing a Spanish-language dialog to a user 140 via the chat client 170. The send button 510 and other user-interface elements of the chat interface 502 are shown in English, but they may be translated to other languages in some embodiments.

In this example, the AI system 180 includes the exemplary dialog tree 300 of FIG. 3 for which American English is the primary language. The user 140 may transmit a message 732 (e.g., an utterance or query) using the same procedure described with respect to FIG. 5. Here, the user transmits a message 732 in Spanish, "¿Cuál es el saldo de mi cuenta?" (meaning "What is my account balance?"), to the online chat module 132.

As described in step 605 of the process 600, the online chat module 132 may receive the message and insert it into the chat flow (e.g., using the chat session manager 204) associated with the online chat session, and send the message 732 to the chat robot 210. As described in step 606 of the process 600, the online chat module 132 may determine that message 732 is in a different language (Spanish) than the primary language (American English) of the AI system 180. For example, the online chat module 132 may determine that the language is Spanish based on a header received with the message indicating that the user 140 is associated with the es_MX (Mexican Spanish) locale. In response, the online chat module 132 may use machine translation techniques to translate the message 732 into English as described in step 610 of the process 600. For example, the Spanish message 732 may be translated into the English message "What is my account balance?". The online chat module 132 may then transmit the translated message to the AI system 180 as described in step 615 of process 600.

The intent engine 220 of the AI system 180 may determine that the intent of the translated message corresponds to the Check_Balance intent. For simplicity, an exact English translation of the Spanish message 732 is used in this example, but an approximation may suffice. For example, a machine translation that includes the word "balance" may be sufficient for the intent engine 220 to determine the correct intent. The intent engine 220 may locate the node 306 corresponding to the Check_Balance intent in the dialog tree 300, and the response module 222 may prepare a response that includes the node ID and the response text. For example, the response may be {"nodeID": 2, "responseText": "Your balance is $Balance", . . . }. In some embodiments, the response text may not be included in the response (e.g., a request to the AI system 180 may indicate that only a node ID should be included in the response.) The AI system 180 may then transmit the response to the online chat module 132.

As described in steps 618 and 620 of the process 600, the response from the AI system 180 may be intercepted before being processed and delivered to the user (e.g., by the response translation module 212 based on determining that the locale corresponding to the message 732, es_MX, is present in the list of supported non-primary languages or locales in the chat module configuration 202, or based on the language-mismatch flag being set). As described in step 630 of the process 600, the response translation module 212 may retrieve Spanish response text corresponding to the English response from a mapping at the translation data store 235. For example, the response translation module may extract the node ID (2) from the English response, and use it as part of a key to retrieve the Spanish response text from the translation data store 235. The key may be, for example, <2, es> (where "es" represents Spanish) or <2, es_MX> (where "es_MX" is a locale string representing Spanish and Mexico), and the corresponding value (i.e., the Spanish response text) may be "El saldo de su cuenta es $Balance." (which translates to "Your account balance is $Balance.").

The response translation module 214 may send the Spanish response text to the chat robot 210, which may prepare a response message 738 using the Spanish response text. The chat robot 210 may replace the $Balance variable with the actual balance of the user's 140 account ($500.00) by, for example, communicating with other components of the service provider server 130 to retrieve the balance from the account database 136. The chat robot 210 may then transmit the Spanish response message 738 to the chat client 170 (e.g., through the chat session manager 204). The response message 738 may then be displayed in the chat presentation portion 512 of the chat interface 502 on the user device 110.

Figure 8:
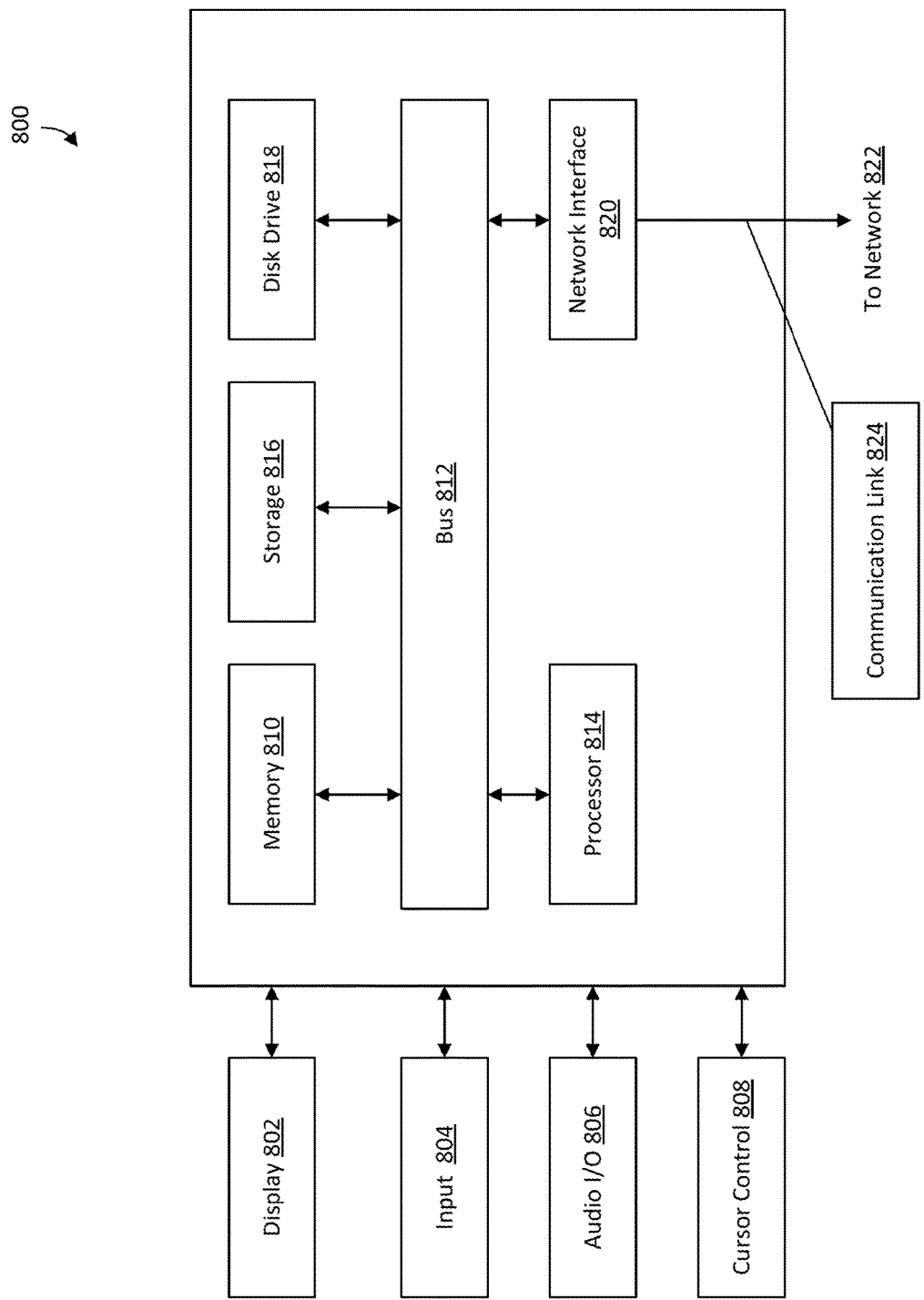
FIG. 8 is a block diagram of a system for implementing a device according to an embodiment of the present disclosure.

FIG. 8 is a block diagram of a computer system 800 suitable for implementing one or more embodiments of the present disclosure, including the service provider server 130 and the user device 110. In various implementations, the user device 110 may include a mobile cellular phone, personal computer (PC), laptop, smart speaker, wearable computing device, etc. adapted for wireless communication, and the service provider server 130 may include a network computing device, such as a server. Thus, it should be appreciated that the devices 110 and 130 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as an optional display 802 and cursor control 808 (such as a keyboard, keypad, mouse, etc.). The display 802 may be configured to present a login page for logging into a user account, a checkout page for purchasing an item from a merchant, or a chat interface for facilitating an online chat session. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid state drive, a hard drive). The computer system 800 performs specific operations by the processor 814 and other components by executing one or more sequences of instructions contained in the system memory component 810. For example, the processor 814 can perform the automated online chat functions described herein according to the processes 400 and 600.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:
1. A system, comprising:
 a non-transitory memory; and
 one or more hardware processors coupled with the non-transitory memory and configured to read instructions from the non-transitory memory to cause the system to perform operations comprising:
  receiving a user query from a user device via a chat robot during an online chat session, wherein the user query corresponds to a first language;
  translating the user query into a second language that is different from the first language;
  transmitting the translated query to an artificial intelligence system comprising a dialog tree;
  obtaining, from the artificial intelligence system, a second-language response in the second language to the translated query based on analyzing one or more semantic properties of the translated query, wherein the second-language response includes a first node ID corresponding to a first node in the dialog tree;
  instructing the artificial intelligence system to abort a transmission of the second-language response to the user device via the chat robot;
  determining, based on the first node ID and the first language, a second node in the dialog tree, the second node generated based on the first node and corresponding to the first language;
obtaining a first-language response in the first language based on the second node; and
providing the first-language response to the user device via the chat robot.

2. The system of claim 1, wherein the obtaining the first-language response in the first language comprises:
retrieving, based on a key comprising a second node ID corresponding to the second node, the first-language response in the first language from a mapping.

3. The system of claim 2, wherein the online chat session is associated with a locale, and wherein the key further comprises a representation of the locale.

4. The system of claim 2, wherein the operations further comprise:
creating an entry in the second language in a knowledge management system;
adding, to the dialog tree in response to the creating, the first node in the second language corresponding to the entry; and
adding, in response to the creating, an element to the mapping corresponding to the entry.

5. The system of claim 2, wherein the operations further comprise:
creating an entry in the first language in a knowledge management system;
adding, to the dialog tree in response to the creating, the second node corresponding to the entry; and
adding, to the mapping in response to the creating, an element in the second language.

6. The system of claim 1, wherein the operations further comprise:
determining a user intent based on the translated query.

7. The system of claim 1, wherein the operations further comprise:
determining that the user query corresponds to the first language based on an analysis of the user query.

8. A method, comprising:
receiving, by one or more hardware processors, a user query corresponding to a first language from a user device via a chat robot during an online chat session;
translating the user query into a second language that is different from the first language;
transmitting, by one or more hardware processors, the translated query to an artificial intelligence system comprising a dialog tree to cause the artificial intelligence system to determine a second-language response in the second language to the translated query based on analyzing one or more semantic properties of the translated query, wherein the second-language response includes a first node ID corresponding to a first node in the dialog tree;
suspending a transmission of the second-language response from the artificial intelligence system;
determining, based on the first node ID and the first language, a second node in the dialog tree, the second node generated based on the first node and corresponding to the first language;
retrieving, from a file, a first-language response in the first language based on a second node ID corresponding to the second node; and
transmitting, by the one or more hardware processors, the first-language response in the first language to the user device via the chat robot.

9. The method of claim 8, wherein the online chat session is associated with a locale and wherein the retrieving the first-language response in the first language is further based on the locale.

10. The method of claim 9, further comprising:
determining that the user query corresponds to the first language based on the locale.

11. The method of claim 8, further comprising:
creating an entry in the second language in a knowledge management system;
adding, to the dialog tree in response to the creating, the first node in the second language corresponding to the entry; and
adding, in response to the creating, a record in the file corresponding to the entry, wherein the record is associated with a key comprising the first node ID.

12. The method of claim 8, further comprising:
creating an entry in the first language in a knowledge management system;
adding, to the dialog tree in response to the creating, the second node corresponding to the entry; and
adding, to the file in response to the creating, a record in the second language, wherein the record is associated with a key comprising the second node ID.

13. The method of claim 8, wherein the translating the user query comprises:
transmitting, by the one or more hardware processors, the user query to a translation engine; and
receiving, by the one or more hardware processors, the translated query, wherein the translated query comprises a machine translation of the user query.

14. The method of claim 8, further comprising:
determining, using an intent engine, a user intent based on the translated query.

15. A non-transitory machine-readable medium having stored thereon machine-readable instructions executable to cause a machine to perform operations comprising:
receiving a user query corresponding to a first language from a user device via a chat robot during an online chat session;
translating the user query into a second language that is different from the first language;
transmitting the translated query to an artificial intelligence system comprising a dialog tree to cause the artificial intelligence system to determine a second-language response in the second language to the translated query based on analyzing one or more semantic properties of the translated query, wherein the second-language response includes a first node ID corresponding to a first node in the dialog tree;
suspending a transmission of the second-language response from the artificial intelligence system;
determining, based on the first node ID and the first language, a second node in the dialog tree, the second node generated based on the first node and corresponding to the first language;
retrieving a first-language response in the first language from a mapping based on the second node; and
providing the first-language response to the user device via the chat robot.

16. The non-transitory machine-readable medium of claim 15, wherein the online chat session is associated with a geographic region, and wherein the retrieving the first-language response in the first language comprises:
retrieving, from the mapping, a value comprising the first-language response using a key comprising a second node ID corresponding to the second node, the first language, and a representation of the geographic region.

17. The non-transitory machine-readable medium of claim 15, wherein the operations further comprise:
   creating an entry in the second language in a knowledge management system;
   adding, to the dialog tree in response to the creating, the first node in the second language corresponding to the entry; and
   adding, in response to the creating, an element to the mapping corresponding to the entry.

18. The non-transitory machine-readable medium of claim 17, wherein the operations further comprise:
   populating the element in the mapping with a machine translation of text included in the first node.

19. The non-transitory machine-readable medium of claim 15, wherein the operations further comprise:
   creating an entry in the first language in a knowledge management system;
   adding, to the dialog tree in response to the creating, the second node corresponding to the entry; and
   adding, to the mapping in response to the creating, a new an element in the second language.

20. The non-transitory machine-readable medium of claim 15, wherein the user query is transcribed from speech.

* * * * *

UNITED STATES PATENT AND TRADEMARK OFFICE
CERTIFICATE OF CORRECTION

PATENT NO. : 11,663,422 B2
APPLICATION NO. : 16/898038
DATED : May 30, 2023
INVENTOR(S) : Amit Pandey et al.

It is certified that error appears in the above-identified patent and that said Letters Patent is hereby corrected as shown below:

In the Claims

Column 29, Lines 23-24, change "response to the creating, a new an element in the second language." to --response to the creating, an element in the second language.--.

Signed and Sealed this
First Day of August, 2023

Katherine Kelly Vidal
*Director of the United States Patent and Trademark Office*